R. H. DAVIS.
APPARATUS FOR TESTING AIR.
APPLICATION FILED MAR. 27, 1911.
1,027,823.
Patented May 28, 1912.
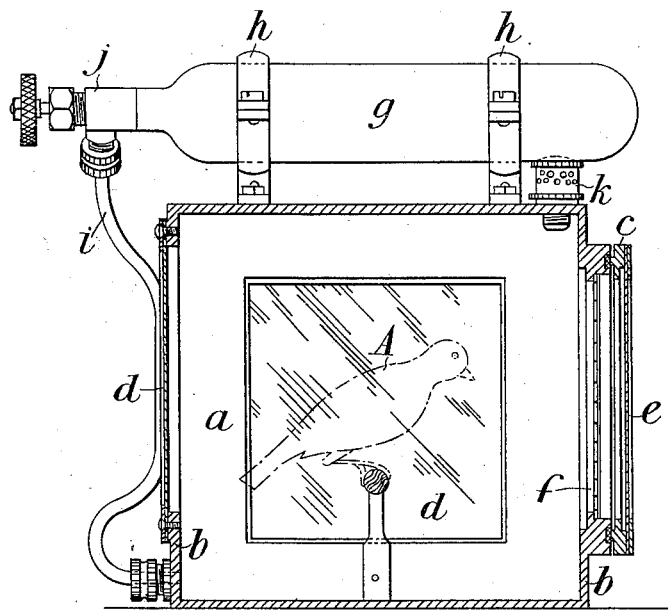
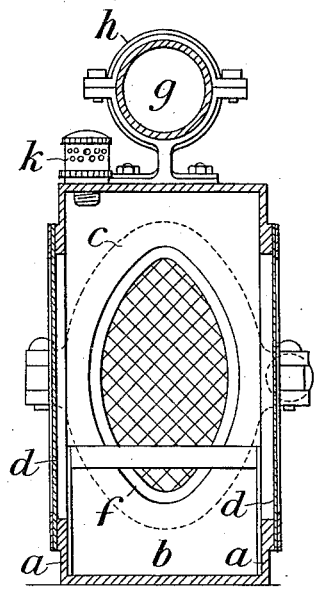
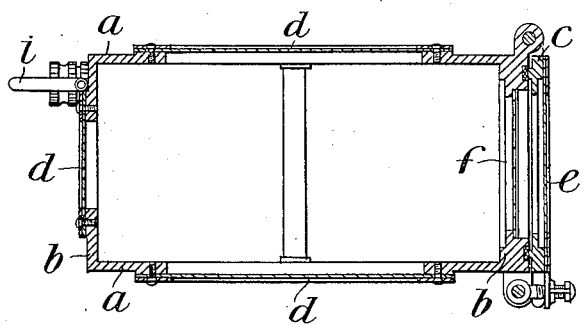

UNITED STATES PATENT OFFICE.

ROBERT HENRY DAVIS, OF LONDON, ENGLAND, ASSIGNOR OF ONE-HALF TO SIEBE GORMAN AND COMPANY, LIMITED, OF LONDON, ENGLAND.

APPARATUS FOR TESTING AIR.

1,027,823.  Specification of Letters Patent.  Patented May 28, 1912.

Application filed March 27, 1911. Serial No. 617,248.

*To all whom it may concern:*

Be it known that I, ROBERT HENRY DAVIS, a subject of the King of Great Britain, residing at 187 Westminster Bridge road, London, England, have invented a new and useful Apparatus for Testing Air, of which the following is a specification.

This invention relates to apparatus for testing air, and is designed for use by men equipped with rescue apparatus for testing the air at any point, say of a mine so as to localize poisonous zones.

According to the invention, the apparatus comprises an air-tight box, which may be made of aluminium or other suitable material, and is advantageously furnished with windows glazed preferably with mica. One end or side of the cage is provided with a hinged door which is glazed as above described, and the end or side of the box opposite to the said door, when closed, is formed with an opening corresponding to that of the window and which is closed with metal gauze. The box or cage is designed to be supplied with oxygen either by a flexible tube connecting the interior of the said box with the breathing bag of the rescue apparatus, or from an independent oxygen cylinder which may be fitted to the box and which may serve as the handle thereof. The box is fitted with a relief-valve and the oxygen supply pipe may be fitted with a regulating or pressure-reducing valve to regulate the quantity of oxygen flowing into the box.

The box is designed to contain a small animal such as a bird or mouse, and it is used as follows, that is to say, the rescue party bearing the apparatus proceeds with the same until it reaches a point at which it is desired to test the atmosphere. The door is then opened to admit the surrounding atmosphere into the box. If carbon-monoxid or other poisonous gas is present in the atmosphere, the bird, mouse or other animal in the box becomes affected. When this happens the door is closed down and oxygen admitted to revive the animal.

To enable the invention to be fully understood I will describe it by reference to the accompanying drawing, in which:—

Figure 1 is a longitudinal sectional elevation of apparatus made according to the invention. Fig. 2 is a vertical transverse section thereof, and Fig. 3 is a horizontal section of the apparatus.

$a, a$ and $b, b$ are respectively the sides and the ends of the box formed of aluminium or other material and $c$ is the hinged door which is provided in connection with one of the ends $b$.

$d, d, d$ are the mica or other windows provided upon the sides and one of the ends, and $e$ is the corresponding window which is fitted in the door $c$, $f$ being the gauze-closed aperture in the end $b$ of the box adjacent to the door $c$.

$g$ is the oxygen cylinder which is secured upon the top of the box $a, b$ through the medium of the clamps $h, h$, the said cylinder $g$ being so arranged relatively to the box that it serves as a handle by means of which the latter can be transported. $i$ is the flexible pipe connecting the outlet from the said cylinder $g$ with the interior of the box and $j$ is a reducing-valve by means of which the quantity of oxygen passing from the cylinder $g$ into the box may be regulated as desired.

$k$ is the relief-valve through which the oxygen and poisonous gas leaves the box.

As will be understood, the apparatus is employed as follows, that is to say, the animal, such as the bird indicated at A, Fig. 1, is introduced into the box, the door $c$ of which is then closed. The apparatus is then carried to the point at which it is desired to test the atmosphere and the door $c$ is opened so that the interior of the box is placed in communication with the external atmosphere, which, if containing carbon-monoxid or other poisonous gas affects the bird A in the box, the said bird being prevented from escaping from the box by the gauze closure $f$. In the event of poisonous gas being present in the atmosphere and affecting the bird, the door $c$ is promptly closed and oxygen admitted from the cylinder to revive the bird. By systematically employing the apparatus it would be possible to localize poisonous zones in mines and other places.

It will be obvious that the oxygen supply, instead of being obtained from a cylinder attached to, or forming a handle for, the apparatus as above described and as illustrated, may be obtained from any other source say, for example, the breathing bag of the rescue apparatus of the person carrying the testing apparatus.

I claim—

1. An apparatus for testing air, comprising a compartment adapted to receive a living creature, the construction of said compartment providing means for the admission of said creature and for closing it, to retain the same, said compartment being also provided with means for the admission of exterior air, and a device for closing said air admitting means, to render the compartment airtight, and means for supplying oxygen to the interior of said compartment.

2. An apparatus for testing air comprising an airtight compartment adapted to receive a living creature and provided with windows covered with transparent material, a door in said compartment for the admission of exterior air and means for supplying oxygen to the interior of said compartment when said door is closed.

3. An apparatus for testing air comprising an airtight compartment, the interior of which is visible from the exterior thereof, and including a door by which exterior air may enter said compartment, a sheet of perforated material disposed between said door and the interior of said compartment, and means for supplying oxygen to the interior of said compartment when said door is closed.

4. An apparatus for testing air comprising a compartment, a door in said compartment by means of which exterior air may be admitted thereto, clamps secured to said compartment adapted to hold an oxygen tank, and means for conducting the contents of said oxygen tank to the interior of said compartment.

5. An apparatus for testing air comprising a compartment, a door at one end of same by means of which exterior air may enter said compartment, an oxygen tank held by means of clamps secured to said compartment, said tank being adapted to furnish oxygen to the interior of said compartment and also act as a handle for the apparatus, and a relief valve in said compartment by means of which oxygen and poisonous gas may escape.

ROBERT HENRY DAVIS.

Witnesses:
H. D. JAMESON,
C. P. LIDDON.

Copies of this patent may be obtained for five cents each, by addressing the "Commissioner of Patents, Washington, D. C."